B. B. NEUTEBOOM.
INTERNAL COMBUSTION ENGINE.
APPLICATION FILED AUG. 9, 1917.

1,398,703.

Patented Nov. 29, 1921.

INVENTOR
Boudewijn B. Neuteboom
Ralzemond A. Parker
ATTORNEY

UNITED STATES PATENT OFFICE.

BOUDEWIJN B. NEUTEBOOM, OF DETROIT, MICHIGAN.

INTERNAL-COMBUSTION ENGINE.

1,398,703.  Specification of Letters Patent.  Patented Nov. 29, 1921.

Application filed August 9, 1917. Serial No. 185,225.

*To all whom it may concern:*

Be it known that I, BOUDEWIJN B. NEUTEBOOM, a subject of the Queen of Holland, residing at Detroit, county of Wayne, State of Michigan, have invented a certain new and useful Improvement in Internal-Combustion Engines, and declare the following to be a full, clear, and exact description of the same, such as will enable others skilled in the art to which it pertains to make and use the same, reference being had to the accompanying drawings, which form a part of this specification.

My invention relates to internal combustion engines and an object of my improvements is to secure a more efficient cooling of the cylinder.

I accomplish this object in the device illustrated in the accompanying drawings in which—

Figure 2:
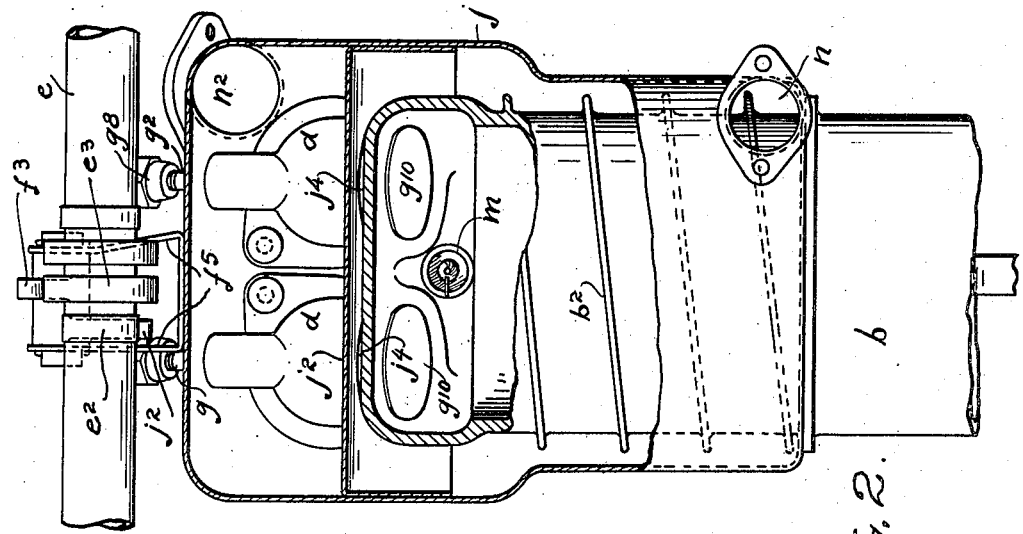
Fig. 2 is a partial section looking from the right of Fig. 1.
Figure 1:
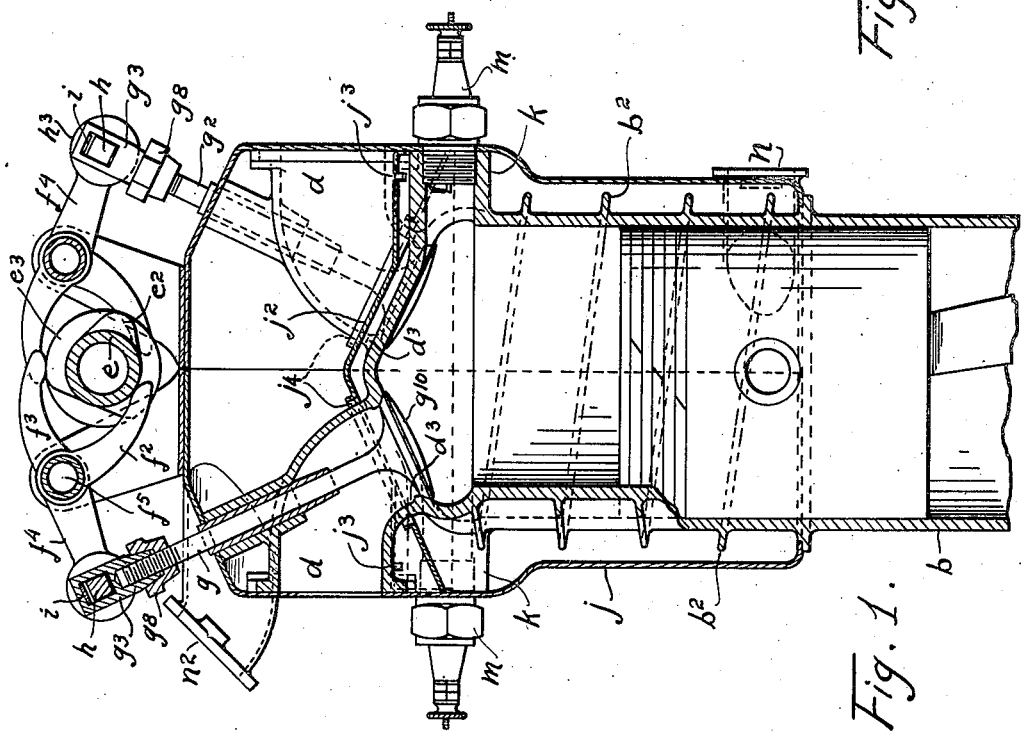
Figure 1 is a vertical, central section of a cylinder having a construction embodying my invention.

$bbbb$ are cylinders and $d\ d^2$ is the intake manifold of an internal combustion engine.

$b^2$, $a^b$, $b^2$ are cooling ribs or fins which are formed as spiral projections around the upper ends of the cylinders $b$.

$j$ is a sheet metal casing surrounding the upper end of each of the cylinders $b$ and forming a water jacket which incloses the cooling ribs $b^2$ and the upper end of the cylinder. The casing $j$ is formed in two halves divided in a diametral plane which are adjusted in place, bringing their edges together and the edges are then welded forming an integral casing.

$k$ are projections extending laterally from the upper ends of the cylinders which projections are hollow and adapted to receive spark plugs $m$. The projections $k$ abut against the inner wall of the casing $j$ at their outer ends and form a tight joint therewith.

$j^2$ is a sheet metal partition stamped in the form indicated in the drawings and adapted to fit within the casing $j$ and extend over the upper end of the cylinder $b$. The partition $j^2$ divides the water jacket chamber into two parts, the lower part directly surrounding the cylinder at the intake end for the cooling water and the upper compartment communicating with the discharge passage $n^2$ for the cooling water.

The intake passage for the water enters the water jacket in a tangential direction so as to distribute the cool water more evenly and to co-act with cooling ribs.

$j^3\ j^3$ are apertures formed through the partition $j^2$ directly above the lateral projections $k$. These apertures cause a flow of the cooling water by said projections to keep the same cool. The partition $j^2$ is also provided with circular openings $j^4$ which surround the passages leading to and from the cylinder, leaving an annular passage between their inner edges and the walls of the cylinder passage so that the flow of the cooling water shall be directed in a comparatively thin stream by and against the walls of said cylinder passages. The partition $j^2$ is divided through the openings $j^4$ for convenience in assembling and after the partition is placed in position with the edges contiguous on the dividing lines $j^5$, such edges are welded together to form an integral partition. Annular flanges are shown extending upward around the openings $j^4$ and of course they might extend downward as well. The cylinder passages and spark plugs require special care in cooling and by the above-described construction the flow of water is concentrated adjacent to these parts.

Claims:

1. In combination with an internal combustion engine cylinder, a water jacket therefor, means for moving water through said jacket, said jacket being so formed as to produce a contracted passageway having a part of said cylinder requiring to be specially cooled as one of its walls.

2. In an internal combustion engine, the combination of a cylinder, a water jacket surrounding said cylinder, a partition adapted to be separately adjusted to place and when so adjusted dividing said water jacket into two compartments, said partition being provided with an aperture therethrough so located that it shall concentrate the flow of water through said jacket upon a part of said cylinder requiring special cooling.

3. In an internal combustion engine, the combination of a cylinder, a water jacket surrounding said cylinder, a partition dividing said water jacket into two compartments, said partition being provided with an aperture therethrough so located that it shall concentrate the flow of water through said jacket upon a part of said cylinder requiring special cooling.

4. In an internal combustion engine, the combination of a cylinder, a water jacket surrounding said cylinder, a partition dividing said water jacket into two compartments, a passage leading to said cylinder to form the intake or exhaust passage, said partition being provided with an aperture, the walls of which surround said cylinder passage leaving a space between its edge and the outer wall of said passage whereby the flow of water through said jacket is concentrated upon the wall of said cylinder passage.

5. In an internal combustion engine, the combination of a cylinder, a part connected with and appurtenant to said cylinder, said part being of such character and so located that it shall be particularly liable to deterioration from overheating, a water jacket surrounding said cylinder and appurtenant part, and a partition dividing said water jacket into two compartments such that the cooling water enters one of said compartments and flows out of the other, said partition being provided with an aperture so located that it shall direct a stream of the cooling water against said appurtenant part.

In testimony whereof I sign this specification.

BOUDEWIJN B. NEUTEBOOM.